Figure 1:
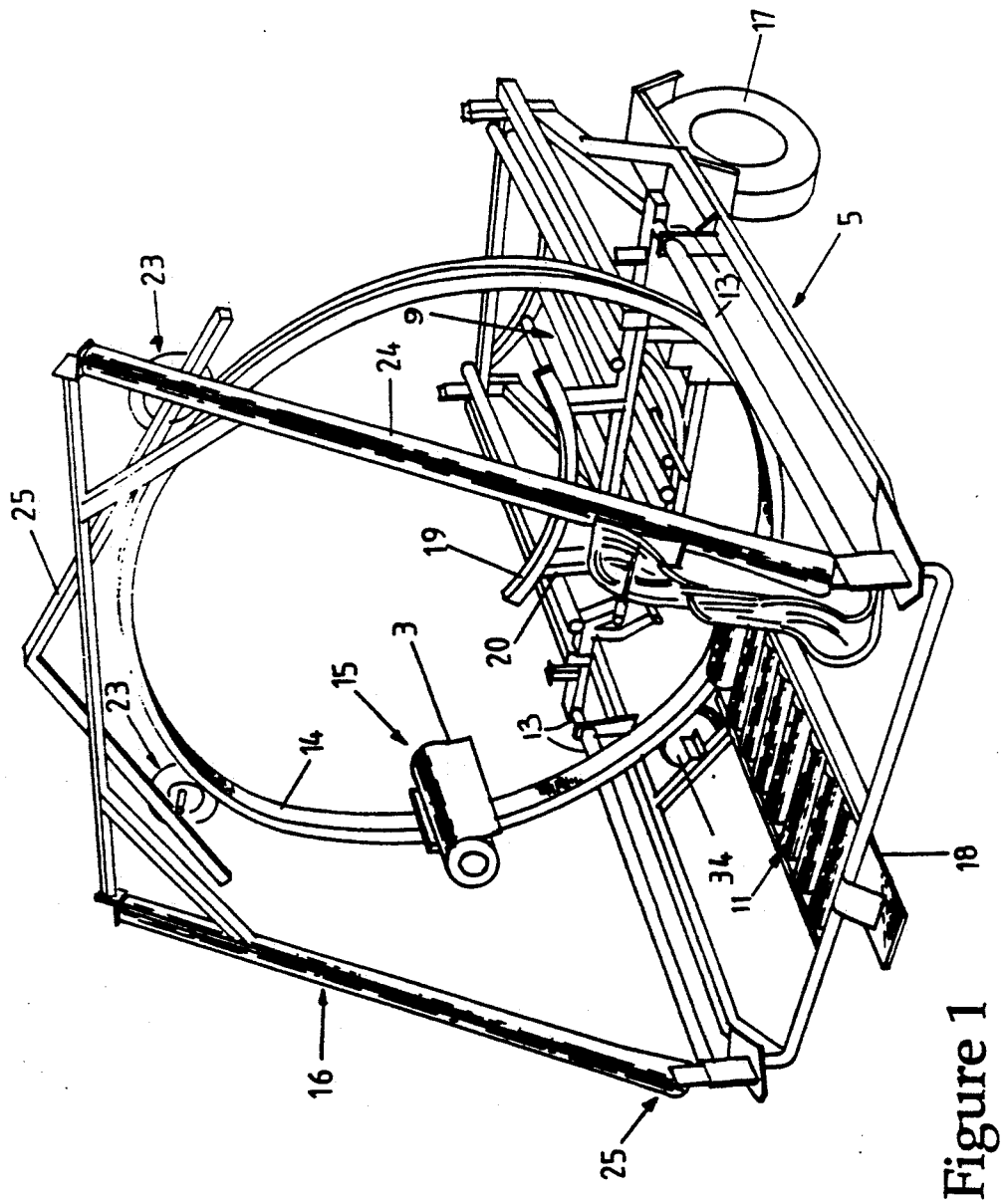

United States Patent [19]
Laver

[11] Patent Number: 5,152,125
[45] Date of Patent: Oct. 6, 1992

[54] APPARATUS FOR WRAPPING ARTICLES

[76] Inventor: Michael R. Laver, Plantation Road, R.D. 2, Cambridge, New Zealand

[21] Appl. No.: 682,656

[22] Filed: Apr. 9, 1991

[51] Int. Cl.⁵ ............................................. B65B 13/12
[52] U.S. Cl. ........................................ 53/588; 53/210; 53/556
[58] Field of Search ................. 53/210, 556, 588, 118, 53/587, 441

[56] References Cited

U.S. PATENT DOCUMENTS

| | | | |
|---|---|---|---|
| 4,050,220 | 9/1977 | Lancaster | 53/588 X |
| 4,110,957 | 9/1978 | Lancaster | 53/588 X |
| 4,593,518 | 6/1986 | Lancaster | 53/556 |
| 4,793,124 | 12/1988 | Anderson | 53/588 |
| 5,012,631 | 5/1991 | Hostetler | 53/588 |

FOREIGN PATENT DOCUMENTS 2303590 8/1973 Fed. Rep. of Germany ........ 53/210

OTHER PUBLICATIONS

Brochure-Grays/Tube-line Balewrapper.

*Primary Examiner*—John Sipos
*Attorney, Agent, or Firm*—Knobbe, Martens, Olson & Bear

[57] ABSTRACT

Apparatus for wrapping a plurality of, nominally cylindrical articles such as hay bales in film to form a long cigar shaped package with the film wound helically thereabout.

A collapsible embodiment to be transportable is disclosed as are embodiments which: are operable on inclined ground; allow variation of wrapping overlap and parameters; place reduced stress on wrapping film; provide drainage for packages.

13 Claims, 8 Drawing Sheets

APPARATUS FOR WRAPPING ARTICLES

This invention relates to apparatus for wrapping a plurality of cylindrical articles with film to form a cigar shaped package.

In particular it is directed towards the wrapping of large articles which are of substantially constant cross-section, such as cylindrical hay bales (which are typically 1.2-2.0 m in diameter and 1.2 m in length), though it is envisaged that the invention may be applied in use for alternatively dimensioned or shaped articles.

Apparatus for the wrapping of such articles is known, most wrapping the articles individually in a manner in which multiple layers of film are wrapped over all the sides of the article. Obviously, such a wrapping method does not make the most efficient use of the film.

Some of these problems have been addressed by a British machine which accepts multiple cylindrical bales of hay and helically wraps a layer of film about same to form a long cigar shaped package. This makes much more efficient use of a film though there are several shortcomings of the British machine. For instance, the overall size of the machine often necessitates it to be drawn behind a tractor as an agricultural implement rather than a trailer behind any vehicle. Road laws in some locales may provide further complications to transporting the device.

Further, most known embodiments of the British machine, which are freewheeling, are not generally suitable for use on inclined ground. The fact that the machine must also be able to continually propel itself along the ground by forcing a wrapped package to the rear make the use of a separate towing or braking vehicle or the inclusion of a braking system impractical.

Further, the geometry and position of supports in the British machine is such that stress is placed on layers of wrapping film due to minor changes in the path or inclination of bales. Each bale may weigh an excess of a tonne and even small changes in its orientation can stress and stretch wrapping films. This stress and stretching affects the integrity of the wrapping and may allow air or water to seep into the package. Apparently this has been addressed in the British machine by wrapping multiple layers of film or increasing the overlap of layers of film to augment the strength of the wrapping layer and to reduce the affects of stress damage to the film.

The present invention seeks to address the above problems or at least provide the public with a useful choice.

Further aspects and advantages of the present invention will become apparent from the ensuing description which is given by way of example only.

According to one aspect of the present invention there is provided apparatus for wrapping a plurality of articles with film to form a cigar shaped package, comprising a supporting mobile frame for feed means, delivery means and wrapping means which are disposed sequentially in the order stated;

and wherein at least the feed and delivery means include supporting guide means which are aligned with each other to form a substantially linear path for an article(s) and which is inclined downwardly to approach ground level at the end of the delivery means distal to said wrapping means, and wherein:

said feed means includes means to drive an article along its supporting guide means towards the wrapping means, and wherein said wrapping means comprises a driven rotatable narrow annular member which supports at least one film feed means, and at least one bracing member fixable to extend diagonally from the frame to the annular member and maintain said annular member in an upright position to encircle an article driven there through, said mobile frame including wheels near the end of the feed means and at least one skid at the alternate end.

According to another aspect of the present invention there is provided apparatus substantially as described above wherein means is provided to alter the upright inclination of the annular member.

According to another aspect of the present invention there is provided apparatus substantially as described above wherein said bracing members are disconnectable from the upright annular member, to allow same to be lowered to a substantially horizontal position.

According to yet another aspect of the present invention there is provided apparatus substantially as described above, which includes a plough for creating a furrow or ridge in the ground adjacent to or under where the package is laid.

Articles suitable for wrapping by the apparatus are nominally of constant cross-sectional dimensions. If the film possesses a degree of elasticity or is stretchable then a greater variation in article size and cross-section may be accommodated.

'Wheel' wherever used in the specification may also include rollers or any other rotating member able to perform the task of a conventional wheel or as may be appropriate for the task.

The present invention comprises three major portions which are supported on a frame. The three portions, which comprise a feed portion, wrapping portion and a delivery portion, are arranged sequentially in the order stated. Each of these portions includes supporting guide means for an article. These are aligned with each other to form a substantially linear path to allow an article to travel from the feed portion, through the wrapping portion and delivery portion. This path is inclined downwardly so that it approaches ground level at the end of the delivery portion distal to the wrapping portion.

The mobile frame comprises essentially a chassis for the aforementioned portions. Wheels are provided which are generally placed near the end of the feed portion. If necessary, several wheel sets may be provided.

A skid, rather than a wheel, is provided at the other end of the frame i.e. near the delivery portion. This may be turned up at the end closest to the wheels to prevent it digging into the ground during travel. The provision of a skid allows the apparatus to travel along the ground with sufficient resistance so that the apparatus may be used on gently to moderately inclined ground without it running away.

A further advantage is realisable through the use of a skid. The increased resistance (over a fully wheeled vehicle) increases the compression between the flat ends of adjacent as they are expelled from the apparatus. Firstly this helps expel air from within the package, allowing improved fermentation if the articles happen to be hay bales (or which air expulsion may be desirable for other reasons). Secondly, such compression, which generally occurs within the delivery portion (after the film has been wound around the articles) tends to crinkle the film into accordion-like folds near the join between adjacent ends of the articles. At the point where the package leaves the apparatus there is often a change in the inclination of its path, resulting in a bending of the package (predominantly near joins between articles) and a stress on the film at the outer radius of curvature (on the lower side of the package). Normally this would lead to an unwanted stretching and damage of the film but in the present invention any increase is accommodated by the accordion-like folds of plastic near each join so that stretching of the film, if not negligible, is minimal.

This resistance may be enhanced through the use of a plough (which by definition may also include a disc, cutting edge or any other feature capable of forming a channel or ridge) which forms a furrow in the ground, this furrow being aligned so that a wrapped package is laid into same. This furrow may be advantageous as the raised edges thereof act as a barrier to water lying on the ground from seeping under the package and eventually into same. The central channel section of the furrow may also act as a natural drainage channel to prevent the wrapped package from sitting directly in a pool of water. Alternatively a furrow or ridge immediately adjacent (generally either side) of where the package is laid, may be provided. Typically the package is laid between two adjacent ridges or furrows. On a slope, an uphill channel to direct runoff from the slope away from the package, may be sufficient.

In some instances it may be desirable to move the apparatus without the skid and/or plough (which may be separate to or integral with the skid) from contacting the ground. A towing bar, which may be removable or integral with the apparatus, may be provided enabling the apparatus to be raised at the delivery end and connected to a towing vehicle. Ultimately, a set of retractable wheels may be provided to enable the apparatus to travel solely on wheels for transport, if desired.

The feed portion comprises that section of the apparatus into which article to be wrapped, may be placed. In the embodiment illustrated later, provision is made for one article to be placed at a time. This portion of the apparatus may be extended to accommodate multiple articles though several matters need be considered. For instance, it has been stated that the path along which an article travels is inclined. Consequently, increasing the length of the feed portion increases the elevation near the end. This may be acceptable if this portion is extended to accept two or three bales but rapidly becomes unacceptable after that. This may be resolved by altering the angle of the feed portion guide means at the feed portion. For instance the inclination of the entire guide means may be different to that of the wrapping and delivery portions. The problem however with such a system is a new article entering the wrapping means is at a different inclination to the wrapped package. Consequently, the top edges do not generally contact when the bottom edges are abutted, which may lead to a less than perfect wrapping about the articles. The integrity of the seal at the join may be improved by altering the upright inclination of the annular member.

Another method when extending the length of the feed portion, is to alter the inclination of the feed portion guide means part way along its length such that the approach to the wrapping portion is at substantially the same inclination as the supporting guide means therethrough. As an extension of this idea, apparatus having a feed portion for a single article may be adapted to be coupled to an auxiliary feed portion able to accommodate further articles. This auxiliary portion may comprise a separate wheeled vehicle complete with its own means of driving articles towards the actual feed portion and then into the wrapping means. Likely the inclination of the supporting guide in the auxiliary portion differs from in the feed portion.

Another solution is to provide for the placing of additional articles to the side which are released to roll or fall into the supporting guide means of the feed portion once the previous article has been fed into the wrapping means. However there is practical limit as to how many articles may be accommodated by such a means.

The feed portion also includes some form of means for driving an article placed on its supporting guide means into the wrapping portion. Quite simply this may be accomplished by using a ramp, typically hydraulic or pneumatic, to force a travelling member acting on the article. This travelling member may act on an end of the article to push it into the wrapping portion or could also comprise clamps, spikes or arms which act on the sides or other parts of the article. Another means may comprise a conveyor system such as a belt or the chain and blade type system commonly used in automated mining and for moving ore away from the face.

The wrapping portion comprises at least a rotating annular member, at least one bracing assembly to maintain this in an upright position and supporting guide means for an article passing therethrough.

The annular member is characterised by being relatively narrow and is generally substantially less than the width of a roll of film used for wrapping an article. In most embodiments, the annular member comprises a single hoop or ring though multiple hoops or additional bracing may also be employed. The annular member need not be perfectly circular though if another geometrical configuration is adopted, it will generally be regular or approximate a circle. Such embodiments should still remain narrow to allow same to be lowered down in collapsible embodiments of the invention.

In operation, the annular member occupies a substantially upright position (as herein defined) and is disposed to encircle an article driven through the central region defined by said annular member. Upright is defined, when used with respect to the annular member, as being substantially perpendicular to the path travelled by an article, and provided by the supporting side means, through the wrapping portion.

Generally at least one bracing assembly is required to maintain the annular member in this upright position. Bracing assemblies may take a great number of forms though may be simply provided by any diagonal member or arch extending from the frame to a point whereby it may support the annular member near its top.

The annular member is rotatable. Typically, the outer surface of the annular member includes a channel or rib which interacts with wheels positioned at various points about its circumference. These wheels may ride in a channel, or a dual pair of adjacent coaxial wheels may allow a rib to pass therebetween. Many other variations and combinations are possible though in most preferred embodiments, an upper set and lower set of wheels are provided, each set comprising at least one wheel or wheel pair.

The lower set are generally load bearing as they support the weight of the annular member. The other set need merely restrain the annular member from falling forwardly or rearwardly and may include wheels whose axis lies substantially within the plane of the annular member or radial thereto.

Rotation of the annular member may be simply achieved by driving one or more of said wheels, typically those of the lower set as the traction due to the weight of the annular member, will be greater. Traction may be further improved by substituting a wheel with a cog which interacts with teeth about the outer circumference of the annular member.

Provision also may be made to allow tilting of the annular member forwardly or backwardly by a limited amount. Most embodiments will fall within the range of $\pm 20°$ of perpendicular to the path of an article as it is wrapped, though a range of $\pm 7.5°$ is more typical for most embodiments. This change in inclination primarily allows alteration of the pitch of the film to be altered and thereby allowing the degree of overlap or number of plies to be altered.

Another important function provided by such tilting is when articles of differing diameters are encountered, not uncommon for hay bales. By way of example, imagine a large bale followed by a smaller bale of 6-10 inches lesser diameter (and therefore height difference as they pass through the apparatus). While wrapping the join between the bales, the film would be wound tightly near the edge of the larger bale though would remain slack near the beginning of the smaller bale unless an exceptionally stretchable film was used. At the next pass of the film about the smaller bale, the edge of the film would have passed the join and be tightly wound about the smaller bale, tucking under the slack portion of the last pass of film.

However when a larger bale follows a smaller bale, the film will still wrap tightly about the smaller bale, and will wrap tightly about the larger bale after it has passed the join, but in the vicinity of the join a loose flap of plastic will remain. By tilting the inclination of the annular member, the film may be displaced 'backwards' to rewrap over this loose piece of film and improve the integrity of the seal offered by the film in this area. The altered pitch of the film accompanying such an operation may also assist in tying down the loose edge.

Wrapping film is supplied from at least one film feed means which is fixed with respect to the annular member. The wrapping film is generally supplied in roll form and a spindle is generally provided about which the roll may be placed and rotated. This spindle is generally fixed to the inside of the annular member and orientated to be substantially parallel to the longitudinal axis of the apparatus. The arrangement may also be such that the middle of the length of the roll coincides approximately with the annular member.

Other methods of fixing the film feed means may also be provided, for instance placing the roll on a spindle which is orientated substantially parallel to a tangent of the annular member and providing a suitable guide, such as arms, to vary the orientation of the film so its plane becomes tangential to the outer surface of the article about which it is wrapped. Many other variations may also be employed.

It is also generally desirable to provide some form of biasing or tension for the film so that it does not spool during or between wrapping operations. Such a tension may be simply provided by a biased arm which rests against the outer surface of the film roll, or by providing resistance to rotation of the roll about the spindle etc. Other feasible and commonly used methods are well known within the plastics industry and many such tensioning methods may be employed.

In a preferred embodiment only one film source is used on the rotating member, though it is equally acceptable to use two film sources i.e. two films are concurrently wound onto the article. In most instances, the films would be fed from diametrically opposite positions to the article. While an even greater number of film sources may be provided, it is generally considered that two or less is preferable lest the pitch of the wound film become too great (unless multiple plies were required). The angle of pitch will have an effect on the amount of film required as well as the rate by which an article must be fed through the wrapping means. Where neither of these represent a problem, or where perhaps the film being wound is short in width, or where perhaps it is desirable to let adjacent film layers overlap substantially (in practice an overlap of 25%-75% would be the norm though an overlap of 5% upward (and exceeding 100%) may be acceptable in some instances), multiple film feed sources may be employed. Alternatively, additional film feed sources may be provided so that a film feed source may be changed over to an alternate source once it runs out or for in cases where plies of different film types were required. Additional film feed assemblies could be adapted to dispense string, tape or netting and the term 'film', wherever used within this specification and claims, shall include tapes, netting and such like which are provided on rolls.

A modification to a film feed assembly may be the provision of a tensioned roller to pass over the surface of an article and smooth out any bumps or protrusions before film is wrapped about same. An existing film feed assembly may include such a modification or assemblies containing only such a mechanism may be provided.

To power rotation of the annular member, some sort of motive means, either inclusive with or external to the apparatus, is required. This may comprise a small hydraulic motor though any other practical means, including an electric or internal combustion motor or the P.T.O. (Power Take Off) of a tractor may also be employed. Various transmission means may be provided to couple such a motive means to a wheel or wheels which help support the annular member. This may include chains, drive shaft etc. This transmission means may also be coupled to a driving means of the feed portion, which drives an article towards the wrapping means. The transmission arrangement may make rotation of the annular member proportional to the rate by which an article is fed into the wrapping means. If the drive rate of the article is constant, then the motive means may be disengaged from driving the annular member when the drive means of the feed portion is not driving an article towards the wrapping means. A known clutch assembly may suffice, and if said driving means comprises a hydraulic ram, then hydraulic actuation for the clutch may be appropriate.

Also part of the wrapping means is a support means for the article. In embodiments wherein the article to be wrapped is stationary with respect to the frame of the wrapping means (i.e. the rotating annular member rotates with respect to the frame and article) it is preferable that the support means upon which the article sits or rests during wrapping is also wrapped by the rotating film and annular member. In such a case, the end of the support means from which the wrapped article will be released should be free thereby allowing that section of package and film to slide from that section of the support means as the package progresses. Consequently, a preferred embodiment of a support means for the article comprises several rails or spikes spaced parallel apart and substantially parallel to the longitudinal axis of the article, supported only at one end thereof, that end being the end closest to the feed portion. The length and arrangement of the spikes should be such that said spikes or rails are the only portion of the support means which are over wrapped during the wrapping cycle (so the film will not catch on any part thereof). At their fixed ends, said spikes or rails may be attached to any suitable point on the frame or other mounting point (for instance they may be an extension of guide rails on the feed means).

Figure 2:
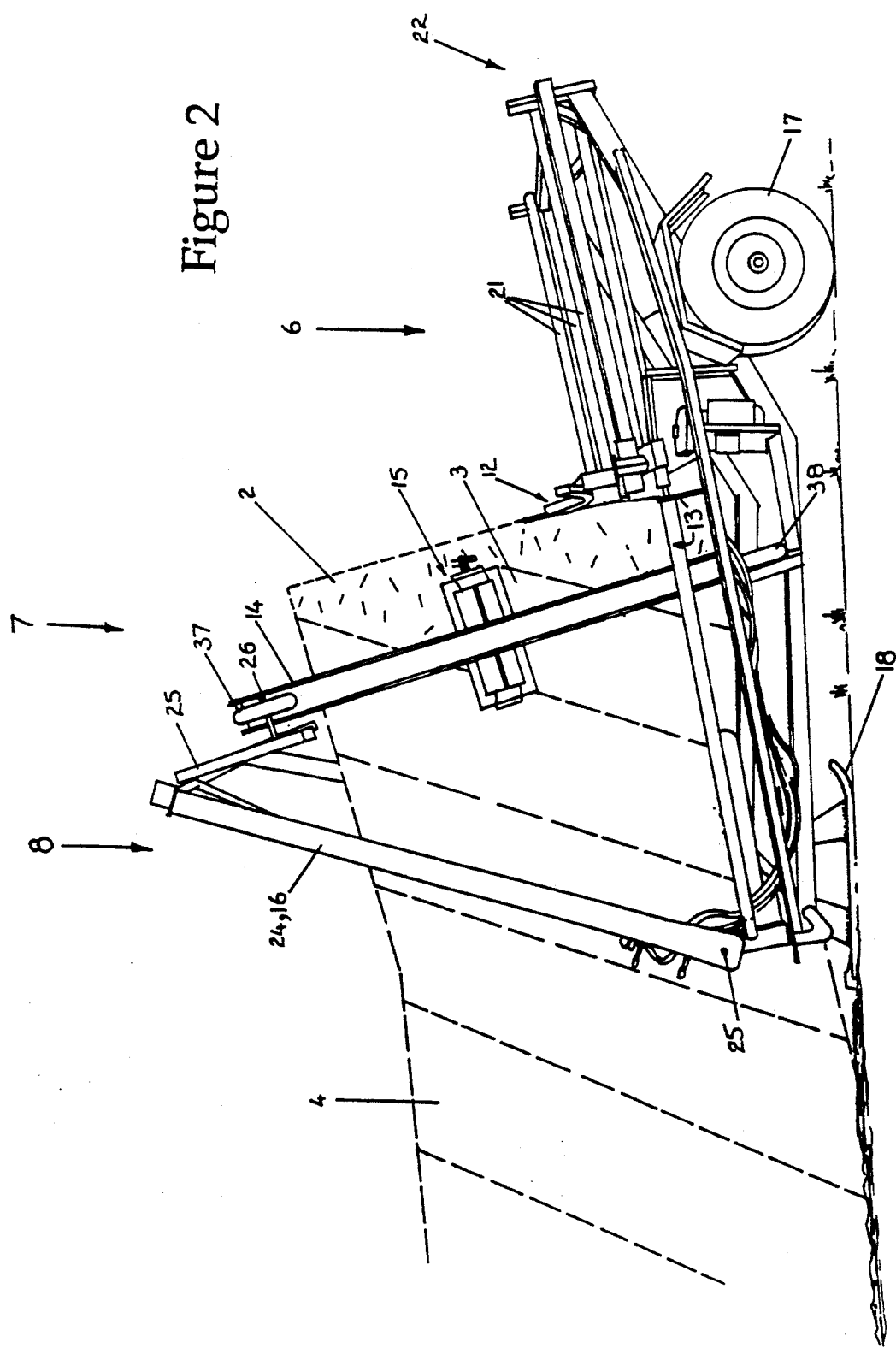
Figure 3:
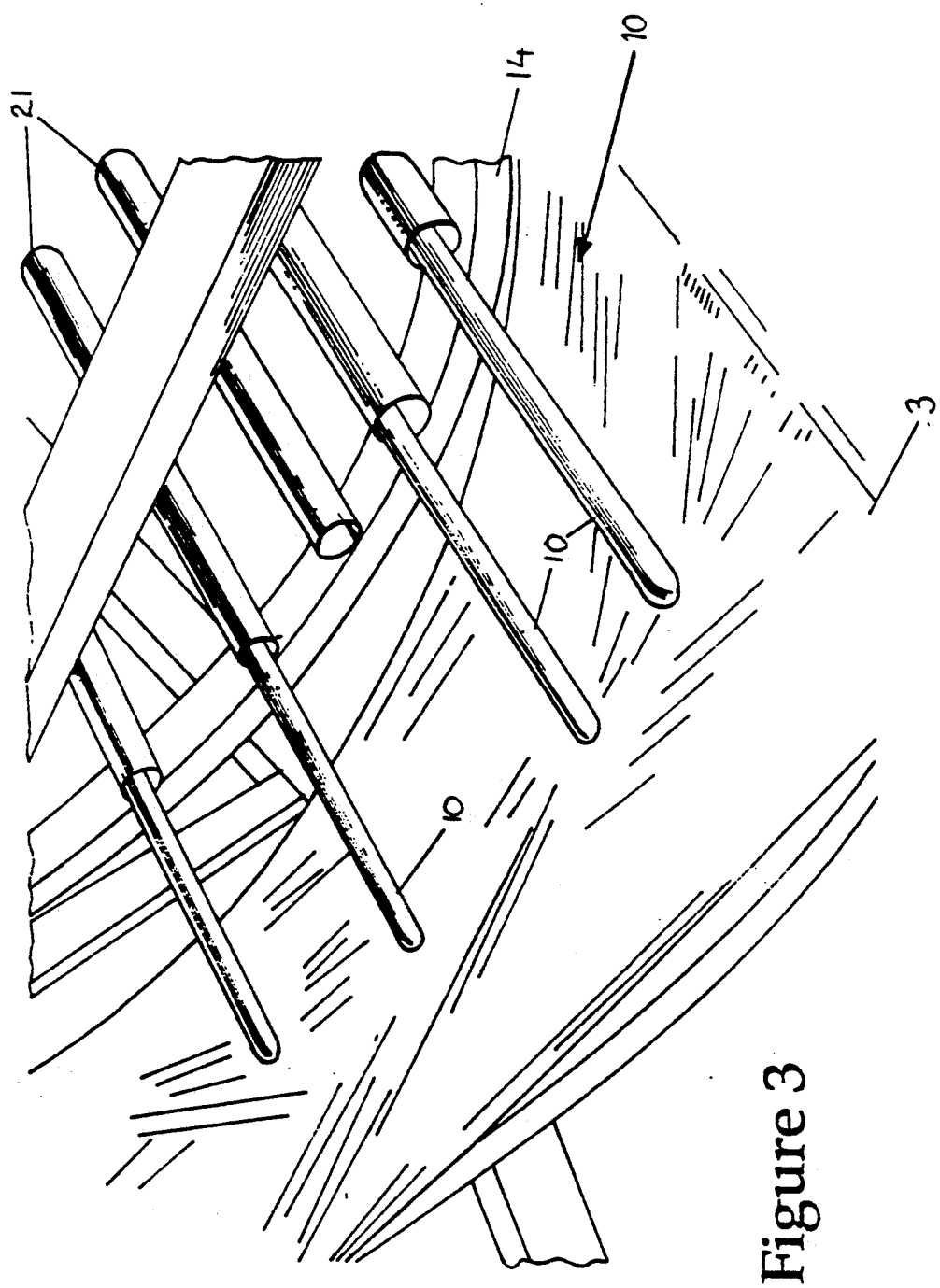
Figure 4:
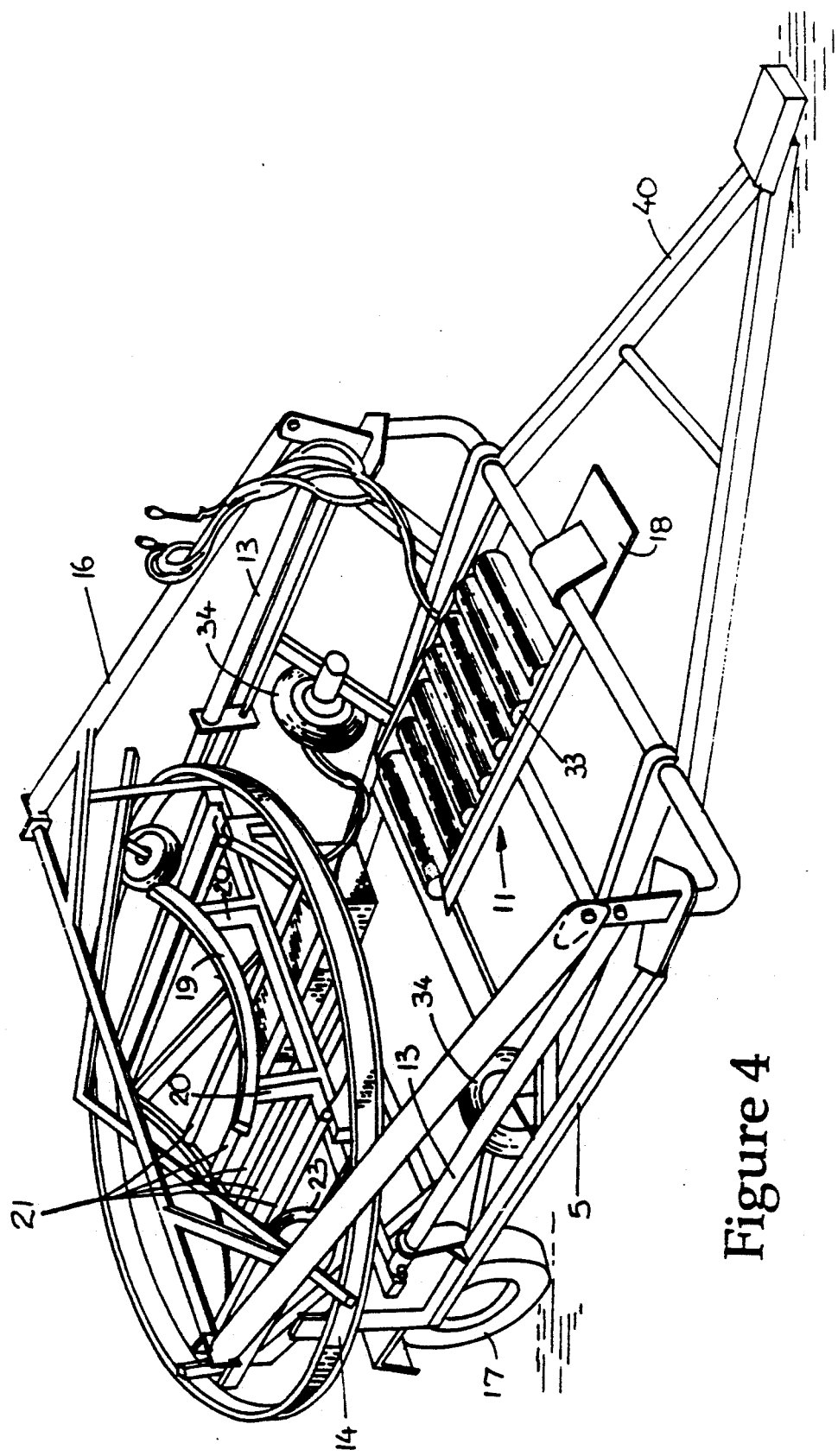
Figure 5:
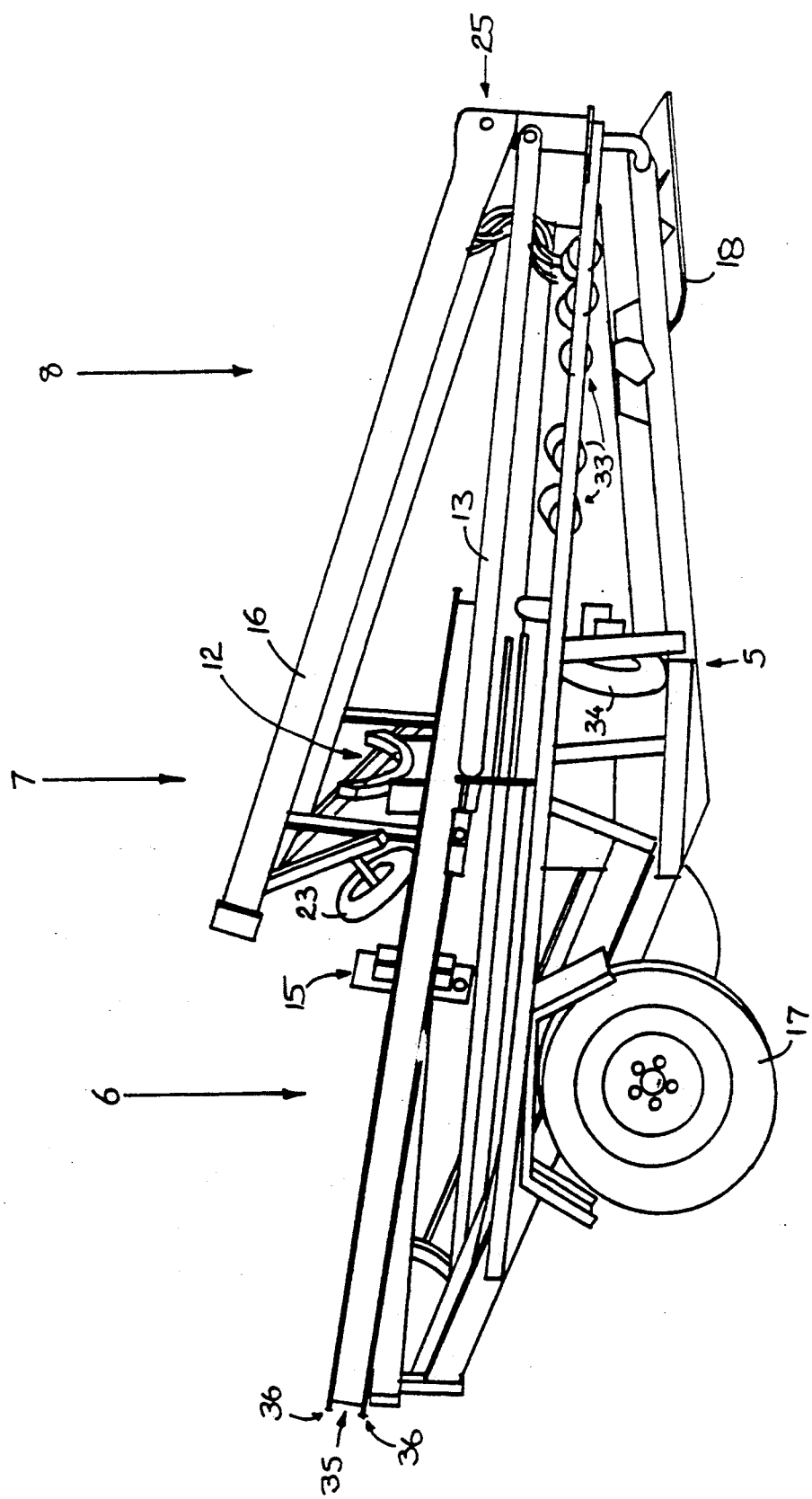
Figure 6:
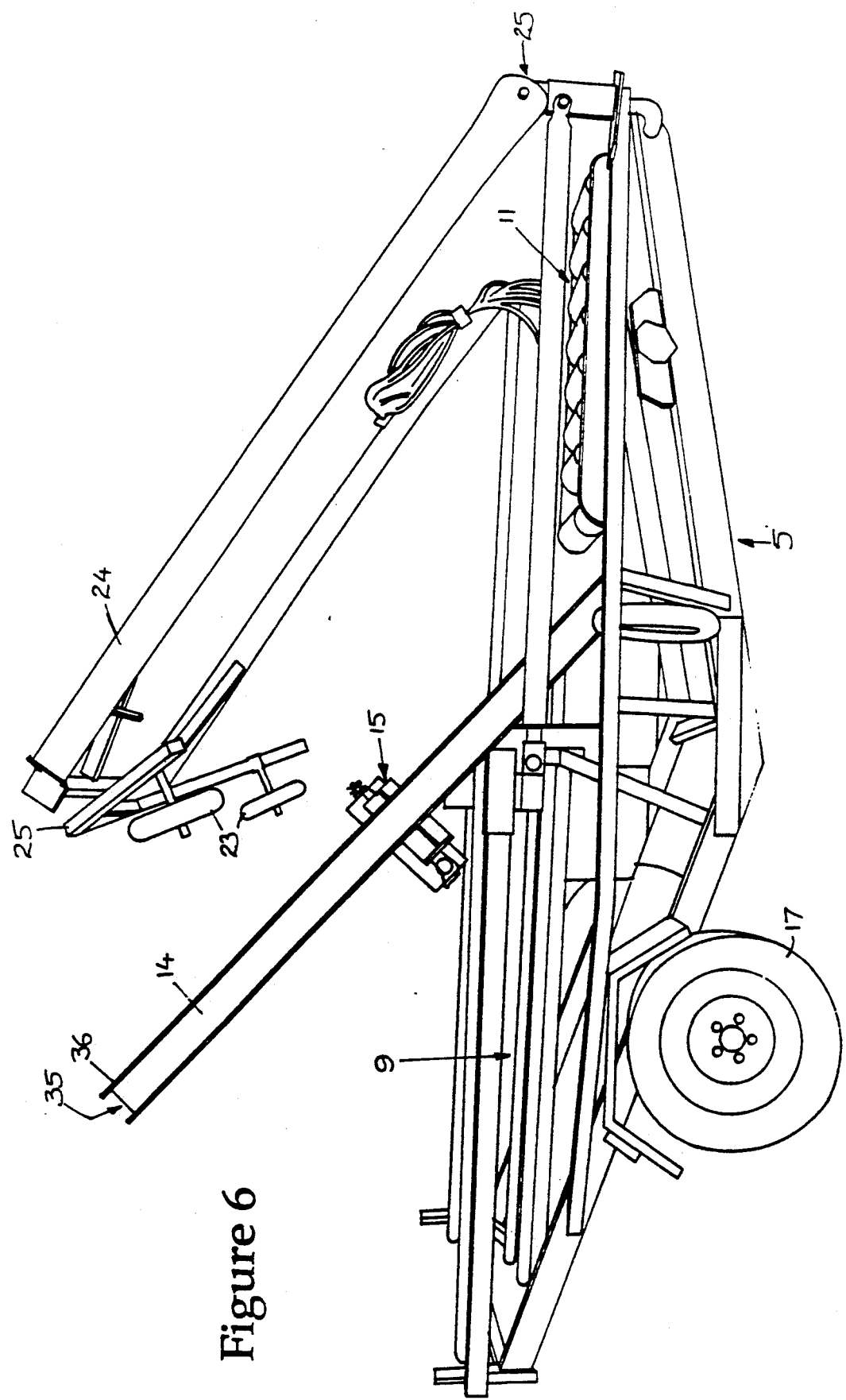
Figure 7:
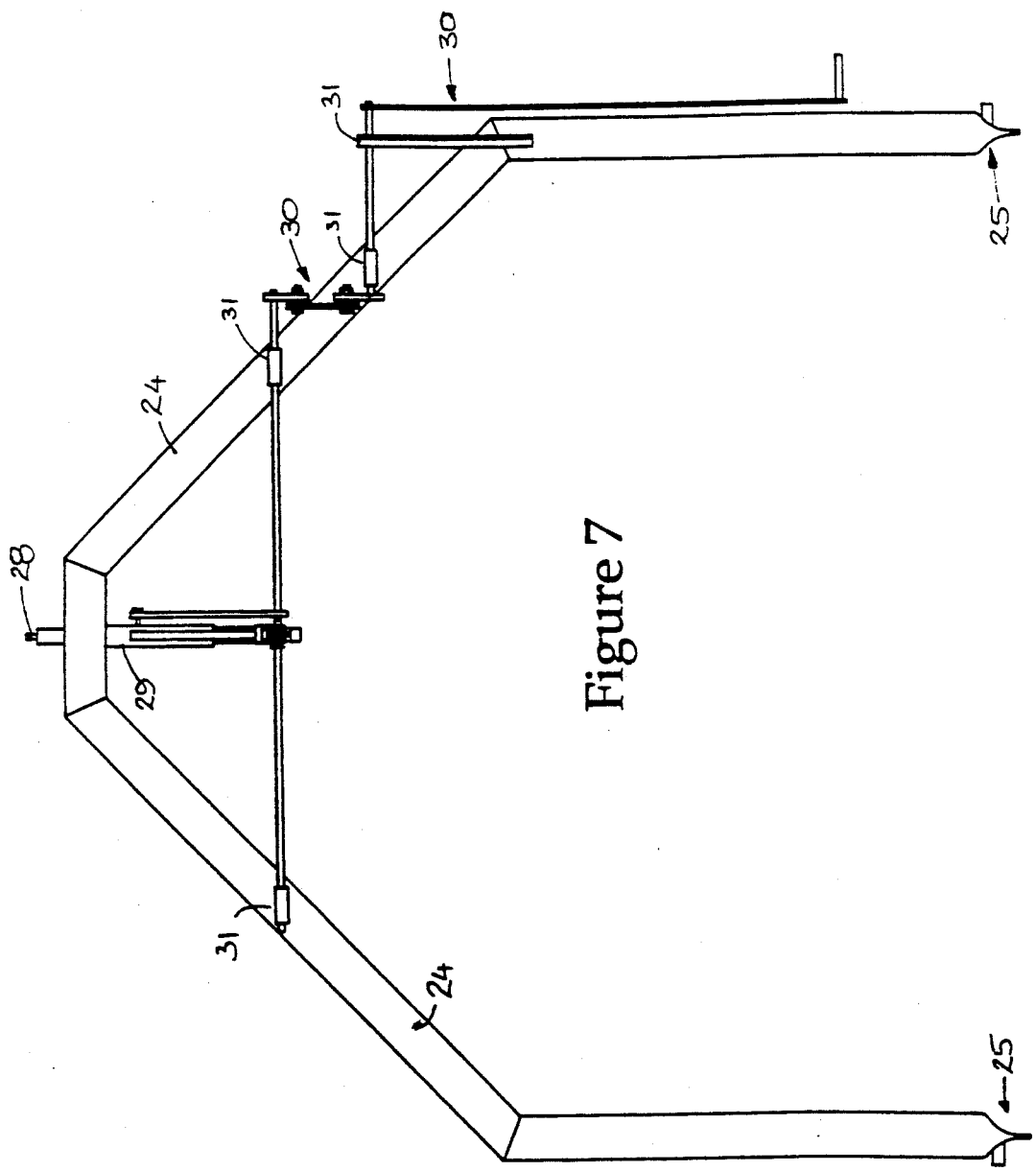
Figure 8:
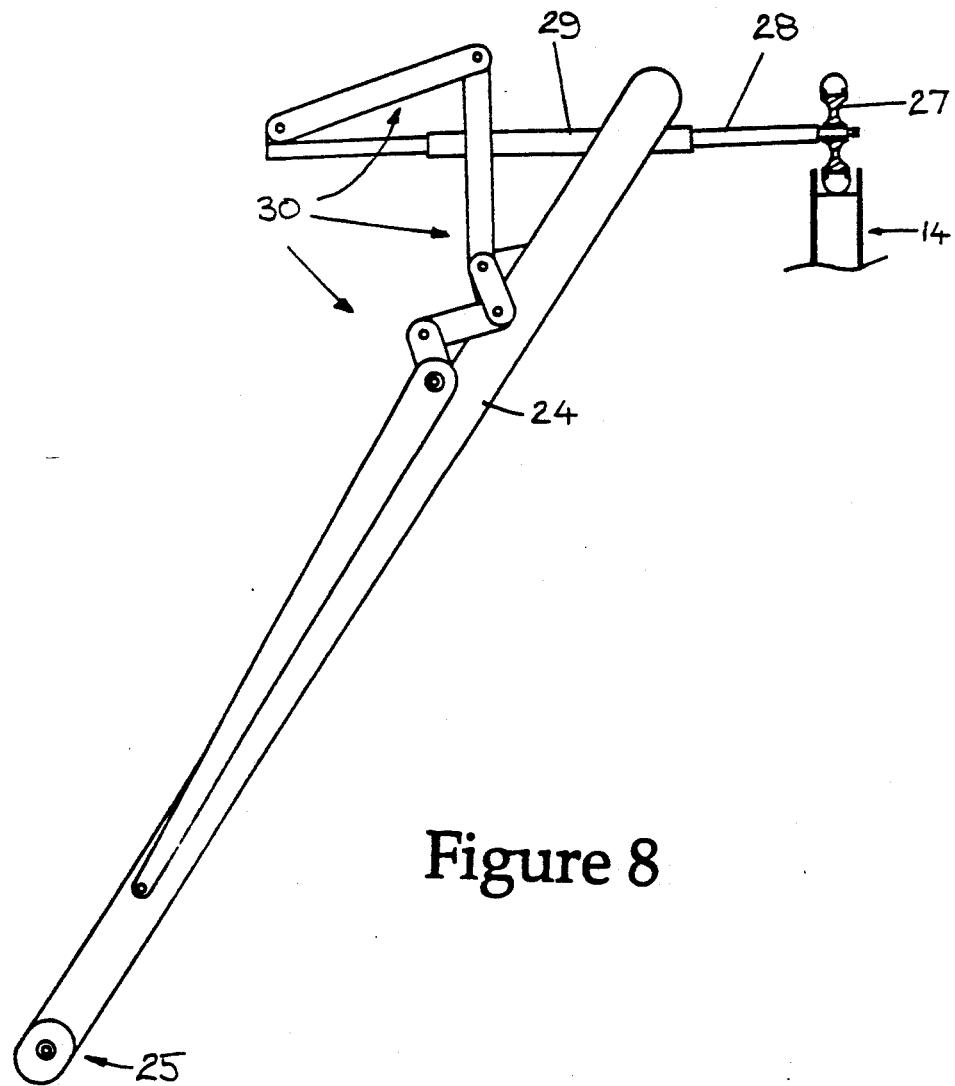

Further aspects and advantages of the present invention will become apparent from the ensuing detail description which is given by way of example only and in relation to the accompanying diagrams in which:

FIG. 1 is a perspective diagrammatic view of an assemble preferred embodiment of apparatus according to the present invention, FIG. 2 is a side diagrammatic view of an assembled preferred embodiment of apparatus according to the present invention illustrating the wrapping of a package, FIG. 3 is a perspective diagrammatic view of guiding support means of the wrapping portion in a preferred embodiment of apparatus according to the present invention, FIG. 4 is a diagrammatic perspective view of the preferred embodiment of FIGS. 1 and 2 when in a collapsed position, FIG. 5 is a side diagrammatic view of the preferred embodiment of FIGS. 1 and 2 when in a collapsed position, FIG. 6 is a side diagrammatic view of the preferred embodiments of FIGS. 1 and 2 when in a partially assembled position, FIG. 7 is a diagrammatic front elevation of the bracing assembly and mechanism for altering the inclination of the annular member in an alternative preferred embodiment of the present invention, and FIG. 8 is a diagrammatic side elevation view of the subject matter of FIG. 7.

With respect to the drawings and by way of example only there is provided in at least FIG. 1, apparatus 1 for wrapping a plurality of articles 2 with film 3 into a cigar shaped package 4, comprising a mobile ground travelling supporting frame, generally indicated by arrow 5, for a feed portion 6, wrapping portion 7 and delivery portion 8 which disposed sequentially in the order stated, and wherein:

each of said feed 6, wrapping 7 and delivery 8 portions include supporting guide means (9, 10, 11 respectively) which are aligned with each other to form a substantially linear path for an article(s) 2, which path is inclined downwardly to approach ground level at the end of the delivery portion 8 distal to the wrapping portion 7, said feed portion 6 includes means 12, 13 to drive an article 2 along its supporting guide means 9 towards the wrapping portion 7, said wrapping portion 7 comprises:

- a driven rotatable narrow annular member 14 which supports at least one film feed assembly 15,
- at least one bracing assembly 16 fixed to extent diagonally from the frame 5 to the annular member 14 for maintaining the annular member 14 in an upright position to encircle an article(s) 2 driven therethrough, with means being provided in the illustrated embodiment to allow adjustment of the upright inclination of the annular member 14, and wherein said supporting guide means 10 included in the wrapping portion 7 extends through the central region defined by the annular member 14, said mobile frame 5 including wheels 17 near the end of the feed portion 6 and at least one skid 18 near the alternate end.

The frame 5 of the apparatus 1 illustrated is of open construction and comprises commonly available steel members welded to each other. A suitable anti-corrosive coating is applied. The frame could also be closed in or formed of panel members without affecting the performance of the apparatus.

To support the frame 5 above the ground, along which it may substantially freely travel, a set of wheels 17 on an axle are provided near one end, typically near the end of the feed portion 6 which has a greater elevation. Near the other end is positioned at least one skid 18 which applies a slight braking effect as the frame 5 travels along the ground.

The feed portion 6 is situated near the front of the apparatus 1 and comprises essentially a supporting guide means 9 formed into a frame 5. This guide 9 comprises a cradle of arcuate cross-section delineated by longitudinally orientated members spaced about the arc. The arcuate nature is complementary to the article 2, which for the embodiments illustrated comprises a cylindrical bale.

Means is provided to drive an article 2 towards the wrapping portion 7. This comprises a travelling end member 12 which in turn comprises a cross-member 19 supported by several upright members and which may be brought to bear against an end of the article 2. Travel is guided by longitudinal members 21 of the supporting guide means 9. A driving force is provided by two hydraulically actuated rams 13 which are longitudinally orientated and disposed either side of the delivery portion. In operation, the rams 13 are extended and the travelling member 12 is positioned to the forward end 22 of the feed portion 6, an article 2 placed into the guide 9 and the travelling member 12, by a retraction of the rams 13, drives the article 2 towards the wrapping portion 7.

The wrapping portion 7 comprises the central section of the apparatus 1. It includes an annular member 14 which may be lowered or raised according to whether the apparatus 1 is in an assembled or collapsed state.

The member 14 is relatively narrow, primarily to reduce the bulk of same when lowering same into a collapsed state. Typically narrow shall be taken to mean 520 mm or less for a member 14 dimensioned to accept a 1.2 m diameter article.

When laid to rest in a collapsed position, the annular member 14 rests on various members of the frame 5. When raised into an upright inclination (typically by hand) it rests on a lower set 38 of wheels 34 positioned near either side of the frame 5, each of whose planes are transverse to the frame 5 (as is the upright annular member 14). These guiding wheels 34 are positioned, when the apparatus 1 is assembled, to lie within a channel 35 formed by two outwardly extending circumferential flanges 36 at each edge of the annular member 14.

To maintain the annular member 14 in an upright inclination, an upper set 37 of wheels 23 are provided. This upper set 37 is fixed to an arch-like bracing member 24, the lower end of 25 of each leg of the arch being pivotably connected to each side of the frame 5 near the rear (delivery portion) thereof.

Near the top of the bracing arch 24 is an inverted 'V' support member having thereon axles 26 for supporting the upper wheels 23. These wheels ride in the channel 19 of the annular member. The triangle formed between the frame 5, annular member 14 and bracing arch 24 is sufficient to maintain the annular member 14 in an upright inclination without locking the bracing assemblies 16 into position. It is noted however that if the number of upper wheels 23 is reduced, it may be desirable to provide some means for locking the bracing assembly into position.

Provision is made in the illustrated embodiment for altering the inclination of the annular member 14. While changing the geometry by altering the fastening point 25 of the bracing arch 24 or altering the length thereof would alter the inclination, so does altering the position of the upper wheels 23 on their axles 26 i.e. either forwardly or rearwardly along same. In the illustrated embodiment, this may be accomplished by providing packing spacers to distance said wheels 23 along said axle 26 though in FIGS. 7 and 8 is illustrated an arrangement whereby the position of a wheel in the upper wheel set may be altered along an imaginary axis coaxial to said wheel. The illustrated arrangement allows re-positioning by an operator on the ground, even during operation of the apparatus 1.

With reference to FIG. 8, an upper wheel 27, which comprises the only wheel within an upper wheel set 37, is fixedly mounted to an extended axle 28 slidable through a supporting sleeve 29 mounted on the bracing assembly 16. A series of pivoting linking arms 30 mounted 31 to the bracing assembly 16 terminates in a handle for the operator. A variety of mechanisms may be provided enabling travel of a wheel 27 along an imaginary axis (parallel to 28).

To support an article as it travels through the area defined within the angular member 14, is a series of arms, fingers or blades which also extend through this central area. As an article 2 will rest directly upon these guiding supporting members 10, they will be also wrapped in film as the film feed assembly 15 passes around same. It is therefore essential that a film wrapped around an article is able to slide off the ends of same and thus they should be terminated or have free their end closest to the delivery means. This generally means they are attached to a suitable point such as the frame 5 or feed portion guide means 9.

A single film feed assembly 15 is provided, this being affixed to the inside of the annular member 14. This film feed assembly accommodates a commercial roll of plastic film, current common sizes therefor being 600 mm, 750 mm or 900 mm according to the market. Provision may be made to allow different widths of film to be accommodated. The roll of film in the illustrated embodiment is orientated so its axis is substantially parallel to the path of an article 2 through the apparatus 1. A mild tension is applied against the inside of the roll to restrain spooling of the film 3 from the feed assembly 15.

In the illustrated embodiment 1, the annular member may rotate in either direction (this allows the apparatus 1 to be used in windy conditions wherein it is often preferable that the film feed assembly 15 travels with the wind as it passes over the top of an article 2 allowing the wind to assist in the laying of the plastic film 3 on the article 2 rather than getting caught and flapping in the wind). Consequently it is desirable that the film 3 is able to be wound off the film feed assembly 15 in either direction, and typically involves reversing the roll of film on its support.

The delivery portion, generally indicated by arrow 8, typically comprises only a supporting guide 11 to enable a wrapped article to be lead from the apparatus 1 and on to ground. The exit therefrom should be as close to the ground as practicable so as to avoid any step which individual articles 2 within a package 4 may encounter (and possibly drop down thus stretching or stressing the film 3). An optional lead off ramp which extends the guide 11 and drags on (or be supported above) the ground may be provided. This may have an inclination intermediary between the delivery portion guide means 11 and the ground.

There should not be any great or sudden changes in inclination where the path from the delivery portion guide 11 intersects with the ground. Angles of 30° or less are normally acceptable though it is preferable to keep the exit end of the guide 11 within 15° of the ground.

In the illustrated embodiment, the guide means 11 of the delivery portion 8 comprises an array of rollers 33 with transverse axis. If necessary, a brake may be provided to restrict their rotation. This finds advantage for the first article to be wrapped which generally has a tendency to roll from the apparatus 1 before the next article has been brought up after it. Once the package 4 is long enough, the resistance offered by the part of the package already on the ground will prevent this problem. In fact, the resistance offered is great enough that the apparatus 1 will propel itself along the ground as each new article 2 is driven towards the wrapping portion 7 by the driving means 12, 13 of the feed portion.

Not visible in the diagrams, is a small modification to the skid 18 near its front end which scribes a furrow into the ground into which the package 4 is laid.

There is also provided an optional towing bar 40 which allows the apparatus 1 to be towed behind a vehicle for relocation.

While the apparatus described has been essentially in relation to use for the packaging of hay bales it should be appreciated that various aspects of the present invention may find application in other areas.

Aspects of the present invention have been described by way of example only and it should be appreciated that modifications and additions may be made thereto without the departing from the scope thereof as defined in the appended claims.

I claim:

1. Apparatus for wrapping a plurality of articles with film into a cigar shaped package, comprising a mobile ground travelling supporting frame for a feed portion, wrapping portion and delivery portion which are disposed sequentially in the order stated, and wherein at least said feed and delivery portions include supporting guide means which are aligned with each other to form a substantially linear path for an articles (s), which path is inclined downwardly and passes through the feed, wrapping and delivery portions sequentially to approach ground level at the end of the delivery portion distal to the wrapping portion, and wherein said wrapping portion comprises: a driven rotatable narrow annular member surrounding said linear path and which supports at least one film feed assembly, at least one bracing assembly fixable to upwardly extend inclined from the frame and said linear path to the annular member for maintaining the annular member in an upwardly inclined position relative said linear path to encircle an article(s) driven therethrough, means for connecting said assembly and annular member for adjusting and maintaining the upright inclination of said annular member with respect to the path of the article(s), said mobile frame including wheels near the end of the feed portion and at least one skid, to support said mobile frame, near the alternate end.

2. Apparatus as claimed in claim 1 wherein the wrapping portion includes supporting guide means aligned with supporting guide means of the feed and delivery portions, said supporting guides means extending through the central region defined by the annular member.

3. Apparatus as claimed in claim 1 wherein said bracing assembly can be disconnected from said annular member and said annular member and bracing assembly lowered to a substantially horizontal position.

4. Apparatus as claimed in claim 3 wherein the driving means of the feed portion comprises a travelling member which pushes an article along a supporting guide means to the wrapping portion.

5. Apparatus as claimed in claim 4 wherein the travelling member is positionable over a lowered annular member to lock it into place.

6. Apparatus as claimed in claim 1 wherein the annular member is rotated at a rate proportional to the rate by which an article is driven into the wrapping portion from the feed station.

7. Apparatus as claimed in claim 1 which includes a plough for creating a furrow or ridge in the ground adjacent to or under where the package is laid.

8. Apparatus as claimed in claim 7 wherein the plough is included in the skid.

9. Apparatus as claimed in claim 1 in which the annular member has at least one of an outer channel or outer rib, means for supporting guiding wheels traveling within said channel to allow the annular member to rotate in its substantially upright position.

10. Apparatus as claimed in claim 9 wherein said said guiding wheels are arranged into at least an upper set and a lower set, there being at least one guiding wheel in each set, and wherein the guiding wheels said adjusting means comprising means for moving forwardly or rearwardly, with respect to the longitudinal axis of the apparatus, to alter the vertical inclination of the annular member and wherein said movement of said wheels results from at least one of repositioning said wheels along an axle supporting same and altering the position of the member of the apparatus supporting said wheel and axle.

11. Apparatus as claimed in claim 2 wherein the supporting guide means of the wrapping portion comprises at least one finger.

12. Apparatus as claimed in claim 1 in which at least one supporting guide means comprises rollers whose axis is substantially transverse with respect to the apparatus.

13. Apparatus as claimed in claim 1 in which the feed portion is adapted to accept more than one article.

* * * * *